Figure 3:
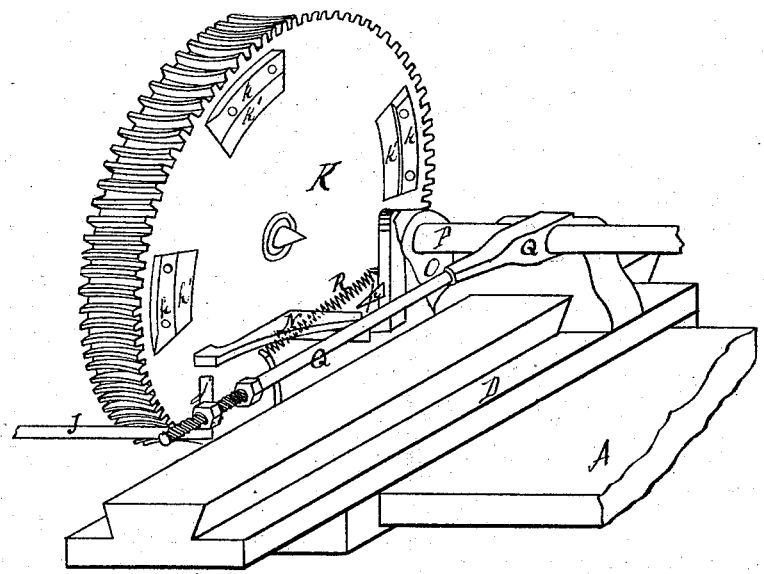

2 Sheets--Sheet 1.
H. E. BOYD.
Lathe Attachments for Cutting Screw-Taps.
No. 153,804. Patented Aug. 4, 1874.
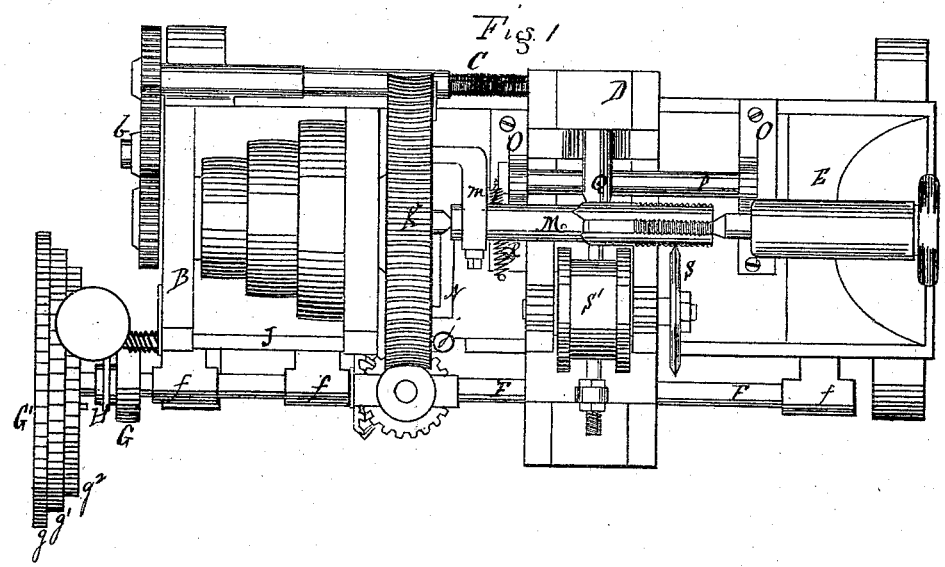
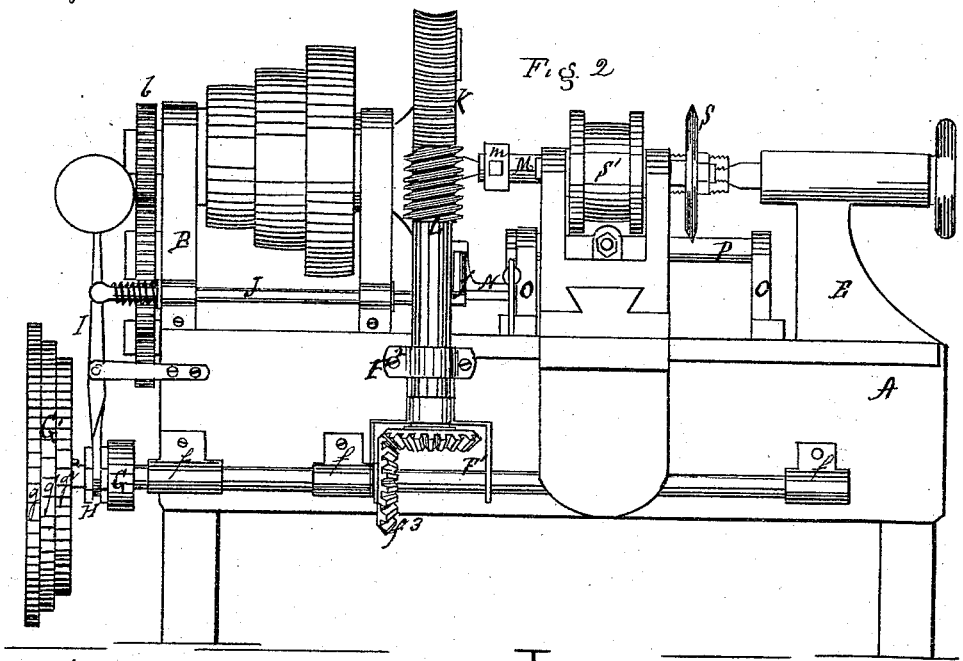
Witnesses
James G. Kay
R. R. Baltz
Inventor
Henry E. Boyd
by Blakewell & Kerr
Attys.

2 Sheets--Sheet 2.

H. E. BOYD.
Lathe Attachments for Cutting Screw-Taps.

No. 153,804. Patented Aug. 4, 1874.

Witnesses
James D. Kay
R. R. Baetz

Inventor
Henry E. Boyd
by Bakewell & Kerr
Attys.

UNITED STATES PATENT OFFICE.

HENRY E. BOYD, OF McKEESPORT, PENNSYLVANIA, ASSIGNOR TO HIMSELF AND JAMES WOOL, OF SAME PLACE.

IMPROVEMENT IN LATHE ATTACHMENTS FOR CUTTING SCREW-TAPS.

Specification forming part of Letters Patent No. 153,804, dated August 4, 1874; application filed July 7, 1874.

*To all whom it may concern:*

Be it known that I, HENRY E. BOYD, of McKeesport, in the county of Allegheny and State of Pennsylvania, have invented a new and useful Improvement in Attachments to Lathes for Cutting Screw-Taps; and I do hereby declare the following to be a full, clear, and exact description thereof, reference being had to the accompanying drawing forming a part of this specification, in which—

Figure 1 is a plan view of the ordinary engine-lathe, to which the devices embodying my invention have been applied; Fig. 2 is a side view of the same; and Fig. 3 is a perspective sectional view.

This invention relates to the manufacture of screw-taps; and has for its object the construction of devices capable of application to the ordinary engine-lathe, so that the same may be used in the manufacture of screw-taps, and the devices are of such simplified form that they may be easily removed and replaced, enabling an ordinary engine-lathe to be used for the purposes generelly intended, and at the same time be readily adapted for the manufacture of screw-taps.

The invention consists in providing the usual feed-rod with loose slow and speed pulleys and combining the same with a clutch operated through a set of levers and by cams attached to or formed at regular intervals upon the face-plate or side of a worm-wheel, whereby a slow motion is automatically given to the blank during the cut, and a rapid motion between the cuts, so that the loss of time and injury to the cutter are avoided; in the combination of cams upon the face-plate or side of a worm-wheel with an elbow-lever, oscillating shaft, and spring, or equivalent arrangement, whereby the revolving cutter is brought into position and automatically fed forward with a progressive movement at stated intervals, so as cut deeper where "clearance" or "relief" is required; and, also, in the manufacture of taps by cutting threads upon blanks which have been previously fluted or grooved, whereby subsequent filing to clear the teeth from the burr is avoided.

In the drawing referred to, A is the frame of the usual engine-lathe, constructed of the common form and mounted upon feet or supports. B is the head-stock, having the usual pulleys and other appliances, and connected through a series of cog-wheels, $b$, with the screw C, which, receiving its motion from the shaft of the pulleys, causes the travel of the tool-rest D along its guides on the frame in the usual manner for cutting screws. E is the tail-stock, and D the tool-rest, all of said devices being of the usual form employed in engine-lathes, and therefore not requiring further description here.

I will now proceed to describe the devices pertaining to my improvement by which I am enabled to utilize the ordinary engine-lathe in the manufacture of screw-taps.

F is the ordinary feed-rod, attached to the side of the frame by brackets $f$, and upon which I place the loose pulleys G G', G being the smaller or speed pulley, and G' the larger or slow pulley, the latter being composed of a series, so as to obtain several rates of speed, and it is by this latter pulley that the shaft is driven when the cut is made. Therefore, several sizes may be employed, as at $g\ g^1\ g^2$, so as to obtain a rate of speed commensurate with the size of the tap to be cut. Upon the feed-rod F, intermediate between the fast and loose pulleys, is the sliding clutch H, controlled by the shipping-lever I, supported in a bracket attached to the main frame, and operated through the sliding shaft J, supported in brackets attached to the upper portion of the frame or to the head-stock. Upon the end of sliding rod J next the tool-rest is a projection or arm, $j$, traveling over the face or side of the worm-wheel K, and upon the opposite end of sliding rod J, between a shoulder on the rod and a bracket supporting the shaft, is a spiral spring surrounding the rod, and having the function hereinafter specified. K indicates a worm-wheel mounted upon the same shaft as the pulleys of the head-stock, and provided (as is also the tail-stop) with centers for supporting the blank from which the tap is to be cut. Upon the feed-rod F, carrying the fast and loose pulleys, is a bevel-wheel, $f^3$, gearing into a similar wheel upon the lower end of the shaft of the worm L, by which, in using the lathe for cutting screw-taps, the motion is imparted to the worm-wheel K. On the feed-rod F, beyond this bevel-wheel, as at F¹, a swinging joint may be formed on the lower part of the stand of the worm, said joint to be concentric with the gear, so as to allow the stand to be swung back out of gear with the worm-wheel by taking out two screws, F², or other suitable fastening device, thereby rendering the lathe instantly available for the purposes of turning. M indicates the blank, supported between the centers of the head and tail stock and clamped to the worm-wheel K by the usual dog $m$. Upon the face-plate or side of the worm-wheel K, at regular intervals corresponding to the number of clearances or grooves in the tap to be threaded, are formed or attached the cams or inclines $k$, two in number at each of said points—one abrupt, as at $k$, the other more gradual, as at $k'$—the first for operating the clutch upon the driving-shaft, and the second for operating an elbow-lever, N, for purposes hereinafter set forth. N indicates an elbow-lever, pivoted to an arm projecting from one of the bearings of the shaft P. One end of this elbow-lever rides against the face of the worm while the other operates an arm or projection, $p$, by which the shaft P is oscillated. P is a shaft, journaled in the bearings O O on the main frame parallel to the travel of the tool-rest. The shaft P is formed so as to act as an eccentric, and, through the medium of rod Q, cause the traveling-block of the tool-rest to move forward, bringing the revolving cutter against the blank at regular intervals, or when the end of the elbow-lever is passing over the cams upon the face of the worm-wheel. R is a spiral or other suitable spring, attached at one end to the arm of the oscillating shaft P, and at the other to some point upon the frame or the bearing, so as to retract or oscillate the shaft when the end of the elbow-lever passes off the cam on the face of the worm-wheel. S indicates a revolving cutter, journaled on the tool-rest, and provided with a suitable pulley, S'. These constitute the devices as constructed by and adapted for attachment to the ordinary lathe. The operation thereof can be best described with reference to the cutting of a blank.

Heretofore, in cutting a screw-tap, the ordinary plain blank has been employed, and the thread cut thereon having the usual pitch, the tool-rest having a forward motion increasing at certain regular intervals, so as to cut deeper and give what is termed a clearance or "relief," so that said clearances or reliefs correspond to the number of grooves or flutes thereafter to be formed upon the screw-taps. But in so forming the screw-tap—that is, by first cutting the thread and afterward grooving the tap—the thread is injured or burrs are formed, which necessitate the filing of the teeth or cutting portion of the tap, to remove the burr, and increasing the expense of manufacture to that extent.

To avoid these in the manufacture of screw-taps, I proceed by first fluting or grooving the blank preparatory to cutting the thread, after which the blank is placed in the position shown at M in the drawing, the grooves corresponding to the intervals between the cams on the face of the worm-wheel and the portion to be cut corresponding to the cam. Power is now applied, through the speed-pulley, to the feed-rod F, and communicated through the bevel and worm gearing to the worm-wheel, revolving it rapidly until the interval between the cams on the face of the worm-wheel is passed and the projection $j$ strikes the abrupt or outer cam $k$, which causes the sliding rod J to operate a shipping lever and the sliding clutch on the shaft F, so as to cause it to engage with the pulley G', which drives the feed-rod F at a lower rate of speed during the time the clutch is being made upon the blank. At the same time that the projection $j$ upon the arm J strikes the abrupt cam $k$, upon the face of the worm-wheel, the end of the lever L reaches the inclined cam and travels along the same, gradually oscillating the shaft P, and through the medium of rod O causing the traveling block of the tool-rest to bring the rotary cutter S into position to cut the thread upon the blank, the incline of the cam being so graduated as to cause, through the oscillation of shaft P, a progressive forward movement of the block carrying the cutter, so as to give the deepest cut or relief just before or at the time the groove is reached where the clearance or relief is required. The projections upon the end of rod J and the end of the elbow-lever L passing simultaneously from the cams and traveling the intermediate space, the spring upon rod J causes it to act upon the lever, so that the clutch is made to take hold upon the swift pulley G, whereby the rate of speed at which the worm-wheel is moved, and necessarily the blank between the cuts is increased, whereby loss of time is avoided.

When it is desirable to use the engine-lathe simply as such, the worm by which power is communicated from the feed-rod F may be swung back out of gear with the worm-wheel by taking out and removing the fastening by which it is attached to the frame, which will enable the power to be applied to the usual pulleys of the machine. The cutter being removed from the sliding block, or with the sliding block, to which it is attached, leaves the lathe comparatively free, as the bell-lever is not so located or attached to the main frame as to interfere with the use of the lathe for ordinary purposes. The worm-wheel, which is the ordinary face-plate of the lathe, being freed from the worms, performs its usual function.

The bearings of the oscillating shaft, which also carry and support the elbow-lever, may be made so as to be readily detachable, either by dovetailed guides or in any other suitable way well known in the art.

The strongest recommendation of the devices contrived by me and above described are their extreme simplicity, and the ease with which they are attached to and removed from the ordinary engine-lathe. The requisites for cutting taps being fully attained by them, namely, the fast and slow motion of the tap, whereby the cutting-tools are not injured nor time lost between the cuts, and the automatic progressive forward movement of the cutter, is to give the required clearance or relief. The method adopted by me of first grooving or fluting the blank avoids the expense heretofore incurred by the subsequent filing to clear the teeth from the burr invariably formed by grooving or fluting the blank after the threads have been made thereon.

Having thus described my invention, I claim—

1. The feed-rod provided with loose slow and speed pulleys, and intermediate clutch and shipping devices, in combination with the worm-wheel and the cams thereon formed at regular intervals upon the face of said wheel, substantially as and for the purpose specified.

2. The worm-wheel provided with suitable inclines or cams, in combination with the elbow-lever, oscillating shaft, and tool-rest carrying the rotary or other suitable cutter, substantially as and for the purpose specified.

3. As an improvement in the method of manufacturing screw-taps in the manner substantially as herein described, first, fluting or grooving the tap, and then cutting the thread thereon, as and for the purpose stated.

In testimony whereof I, the said HENRY E. BOYD, have hereunto set my hand.

HENRY E. BOYD.

Witnesses:
JAMES I. KAY,
T. B. KERR.